(12) United States Patent
Watanabe et al.

(10) Patent No.: US 7,818,199 B2
(45) Date of Patent: Oct. 19, 2010

(54) POLLING SYSTEM AND METHOD PRESENTING A RECEIVED FREE REPLY AS A ANSWER OPTION TO A SUBSEQUENT RESPONDENT

(75) Inventors: Satoru Watanabe, Kawasaki (JP); Masatomo Yasaki, Kawasaki (JP); Kazuki Matsui, Kawasaki (JP); Toshiaki Gomi, Kawasaki (JP); Hideto Kihara, Kawasaki (JP); Youji Kohda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1719 days.

(21) Appl. No.: 10/646,890

(22) Filed: Aug. 25, 2003

(65) Prior Publication Data

US 2004/0049418 A1 Mar. 11, 2004

(30) Foreign Application Priority Data

Sep. 11, 2002 (JP) ............................. 2002-265672

(51) Int. Cl.
G06F 17/30 (2006.01)
(52) U.S. Cl. ...................................................... 705/10
(58) Field of Classification Search ..................... 705/10
See application file for complete search history.

(56) References Cited

U.S. PATENT DOCUMENTS

| | | | | |
|---|---|---|---|---|
| 4,958,284 A | * | 9/1990 | Bishop et al. | 434/353 |
| 5,433,615 A | * | 7/1995 | Clark | 434/322 |
| 6,093,026 A | * | 7/2000 | Walker et al. | 434/322 |
| 6,482,012 B1 | * | 11/2002 | Nocera et al. | 434/236 |
| 6,616,458 B1 | * | 9/2003 | Walker et al. | 434/322 |
| 6,993,495 B2 | * | 1/2006 | Smith, Jr. et al. | 705/10 |
| 6,999,987 B1 | * | 2/2006 | Billingsley et al. | 709/203 |
| 7,249,372 B1 | * | 7/2007 | Bonnstetter et al. | 726/5 |
| 7,437,309 B2 | * | 10/2008 | Magrino et al. | 705/11 |
| 2002/0138334 A1 | * | 9/2002 | DeCotiis et al. | 705/10 |
| 2003/0023685 A1 | * | 1/2003 | Cousins et al. | 709/205 |
| 2003/0041147 A1 | * | 2/2003 | van den Oord et al. | 709/227 |
| 2003/0126010 A1 | * | 7/2003 | Barns-Slavin | 705/10 |
| 2006/0155513 A1 | * | 7/2006 | Mizrahi et al. | 702/179 |

FOREIGN PATENT DOCUMENTS

JP 7-85017 3/1995

(Continued)

OTHER PUBLICATIONS

Patterson, Lois. "Teach Yourself Microsoft Excel® 97 in 24 Hours," 1997.*

(Continued)

*Primary Examiner*—Scott L Jarrett
(74) *Attorney, Agent, or Firm*—Staas & Halsey LLP

(57) ABSTRACT

Polling method that encourages freely opinionated replies and makes for extensive collection of diverse replies. Free reply processing module 9 assigns an option ID to a free reply contained in reply data and associates this free reply with a survey ID and question ID and stores the same in a survey form database 41. A survey form creation module 6 creates a survey form page based on data in the survey form database 41 using HTML or the like and stores this on a Web server 3. The Web server 3 sends the stored survey form page to a respondent terminal 2.

14 Claims, 23 Drawing Sheets

FOREIGN PATENT DOCUMENTS

| | | | |
|---|---|---|---|
| JP | 8-272772 | | 10/1996 |
| JP | 8-272773 | | 10/1996 |
| JP | 9-114817 | | 5/1997 |
| JP | 2000-285111 | | 10/2000 |
| JP | 2001-129261 | | 5/2001 |
| JP | 2002-41756 | | 2/2002 |
| JP | 2002-56343 | | 2/2002 |
| JP | 2002-149900 | | 5/2002 |
| JP | 2002-207856 | | 7/2002 |
| KR | 2002-738434 | * | 6/2002 |
| WO | WO 00/75829 A1 | * | 12/2000 |
| WO | WO 02/19232 A1 | * | 3/2002 |

OTHER PUBLICATIONS

Li Hang et al., Mining from Open Answers in Questionaire Data ACM 2001.*

Hiramatsu A. et al., A Method For Atypical Opinion Extraction from Answers in Open-Ended Questions Proceedings of IEEE Conference on Computational Cybernetics, 2004.*

Giorgetti, Daniela et al., Automated Coding of Open-ended Surveys: Technical and Ethical Issues Date Unknown.*

Reja, Ursa et al., Open-ended vs. Close-ended Questions in Web Questionaires Developments in Applied Statistics, 2003.*

Romano, Nicholas C. et al., The MindMine Comment Analysis Tool for Collaborative Attitude Solicitation, Analysis, Sense-Making and Visualization, Proceedings of the $33^{rd}$ Hawaii International Conference on System Sciences, 2000.*

Kimball, Lisa, Easier Evaluation with Web-based Tools Training & Development, vol. 52, No. 4, Apr. 1998.*

Maher, Jon, Setting Up and Using Questionaires University of Leeds, Jul. 2001.*

SurveySaid.com Web Pages Survey Said, Apr. 1998, Retrieved from Archive.org Sep. 9, 2003.*

MRLIve—Take the pulse of your market—product overview Sep. 2001.*

NetOnCourse.com Web Pages—MI-Live Technology Retrieved Sep. 12, 2002.*

* cited by examiner

| Survey ID | Survey Objective | Mode | Question ID | Question Content | Option ID | Option Content |
|---|---|---|---|---|---|---|
| 11 | Regarding new product "Sixpara" | Initial | 1 | What about customers' questions was difficult to answer? | 1 | Unique color |
| | | | | | 2 | Unique smell |
| | | | | | 3 | Is bitter |
| | | | | | 4 | Other |
| ... | ... | ... | ... | ... | ... | ... |

Fig. 2

| Respondent ID | Respondent | Password | Completed Survey ID | Free Reply Count | Priority Order |
|---|---|---|---|---|---|
| 901081 | Mikiko Tamai | **** | 11,12,13,14,15,16,17,18,19,20 | 1 | 1 |
| 983636 | Hitomi Kaneo | **** | 11,14,17,19,20,23 | 0 | 1 |
| 940332 | Mari Imaizumi | **** | 15,16,17,19,21,22,23 | 2 | 1 |
| 916720 | Manager Yamada | **** | 13,18,20 | 3 | 2 |
| ... | ... | ... | ... | ... | ... |

Fig. 3

```xml
<?xml version="1.0" encoding="UTF-8"?>
<respondent reply list for each questionnaire>
    <survey id="11">
        <!-- ***************************************************** -->
        <question id="1">
            <!-- ------------------------------------ -->
            <respondent id="901081" name="mikiko tamai">
                <reply>
                    <date>20020805</date>
                    <option ID="1"></option>
                    <option ID="2"></option>
                    <option ID="3"></option>
                    <chosen item value="2"type="fix"></chosen item>
                </reply>
            </respondent>
            <!-- ------------------------------------ -->
            <respondent id="983636" name="hitomi kaneo">
                <reply>
                    <date>20020807</date>
                    <option ID="1"></option>
                    <option ID="2"></option>
                    <option ID="3"></option>
                    <option ID="4"></option>
                    <chosen item value="4"type="free">bottle shape</ chosen item>
                </reply>
            </respondent>
        </question>
        <!-- ***************************************************** -->
        </question id="2">
            <!-- ------------------------------------ -->
            <respondent id="901081" name="mikiko tamai">
                <reply>
                    <date>20020805</date>
                    <option ID="1"></option>
                    <option ID="2"></option>
                    <chosen item value="1"type="fix"></ chosen item>
                </reply>
            </respondent>
            <!-- ------------------------------------ -->
            <respondent id="983636" name="hitomi kaneo">
                <reply>
                    <date>20020807</date>
                    <option ID="1"></option>
                    <option ID="2"></option>
                    <option ID="3"></option>
                    <option ID="4"></option>
                    <chosen item value="2"type="fix"> </ chosen item>
                </reply>
            </respondent>
        </question>
    </survey>
</respondent reply list for each questionnaire>
```

*Fig. 4*

| Survey ID | Question ID | Option ID | Respondent Count |
|---|---|---|---|
| 11 | 1 | 1 | 65 |
| | | 2 | 98 |
| | | 3 | 12 |
| ⋮ | ⋮ | ⋮ | ⋮ |

*Fig. 5*

```xml
<?xml version="1.0" encoding="UTF-8"?>
<questionnaire reply list for each respondent>
    <!-- ****************************************************** -->
    <respondent id="901081" name="mikiko tamai">
        <survey id="11">
            <reply>
                <date>20020805</date>
                <question id="1">
                    <chosen item value="2"type="fix"></chosen item>
                </question>
                <question id="2">
                    <chosen item value="1"type="fix"></chosen item>
                </question>
                <question id="3">
                    <chosen item value="4"type="free">has bitter taste</chosen item>
                </question>
            </reply>
        </survey>
    </respondent>
    <!-- ****************************************************** -->
    <respondent id="983636" name="hitomi kaneo">
        <survey id="8">
            <reply>
                <date>20020725</date>
                <question id="1">
                    <chosen item value="2"type="fix"></chosen item>
                </question>
                <question id="2">
                    <chosen item value="6"type="free">refreshing taste is
                        popular</chosen item>
                </question>
                <question id="3">
                    <chosen item value="4"type="free">has bitter taste</chosen item>
                </question>
            </reply>
        </survey>
        <survey id="11">
            <reply>
                <date>20020807</date>
                <question id="1">
                    <chosen item value="4"type="free">bottle shape</chosen item>
                </question>
                <question id="2">
                    <chosen item value="2"type="fix"></chosen item>
                </question>
                <question id="3">
                    <chosen item value="3"type="fix"> </chosen item>
                </question>
            </reply>
        </survey>
    </respondent>
</questionnaire reply list for each respondent>
```

*Fig. 6*

We are conducting a survey on the new product Sixpara.
Thank you for your help.

Question 1: What about the customers' questions was difficult to answer?

☐ (1) Unique color
☐ (2) Unique smell
☐ (3) Other

See up-to-date overall reply results

We are conducting a survey on the new product Sixpara.
Thank you for your help.

Question 1: What about the customers' questions was difficult to answer?

- ☐ (1) Unique color [Comment]
- ☐ (2) Unique smell [Comment]
- ☑ (3) Has a bitter taste [Comment]
- ☐ (4) Other [Comment]

Fig. 13A

Comment on (3) Has a bitter taste

High school girls seem to be put off by the medicine-like taste.

Fig. 13B

We are in the process of compiling a survey on the new product Sixpara. (as of June 25, 2002)

Question 1: What about the customers' questions was difficult to answer?

| | | |
|---|---|---|
| (1) Unique color | 65 | ▬▬▬ |
| (2) Unique smell | 98 | ▬▬▬▬▬ |
| (3) Other | 12 | ▪ |

*Fig. 14*

We are conducting a survey on the new product Sixpara. Thank you for your help.

Question 1: What about the customers' questions was difficult to answer?
☐ (1) Unique color
☐ (2) Unique smell
☑ (3) Other
Has a bitter taste
Send

Fig. 15A

We are conducting a survey on the new product Sixpara. Thank you for your help.

Question 1: What about the customers' questions was difficult to answer?
☐ (1) Unique color
☐ (2) Unique smell
☐ (3) Has a bitter taste
☐ (4) Other Send

Fig. 15B

We are conducting a survey on the new product Sixpara. Thank you for your help.

Question 1: What about the customers' questions was difficult to answer?
- ☐ (1) Unique color
- ☐ (2) Unique smell
- ☐ (3) Has a bitter taste
- ☑ (4) Other It tastes bitter.

Send

*Fig. 16A*

We are conducting a survey on the new product Sixpara. Thank you for your help.

Question 1: What about the customers' questions was difficult to answer?

|                    |   |   |
|--------------------|---|---|
| (1) Unique color   | 1 | ■ |
| (2) Unique smell   | 1 | ■ |
| (3) Has a bitter taste | 2 | ■■ |
| (4) Other          | 1 | ■ |

*Fig. 16B*

We are conducting a survey
on the new product Sixpara.
Thank you for your help.

Question 1: What about
the customers' questions
was difficult to answer?

☐ (1) Unique color
☐ (2) Unique smell
☐ (3) Has a bitter taste
☑ (4) Other

| bitter taste |

[Send]

*Fig. 17A*

We are conducting a survey
on the new product Sixpara.
Thank you for your help.

Question 1: What about
the customers' questions
was difficult to answer?

☐ (1) Unique color
☐ (2) Unique smell
☐ (3) Has a bitter taste
☑ (4) Other

| bitter taste |

[Send]

*Fig. 17B*

We are conducting a survey
on the new product Sixpara.
Thank you for your help.

Question 1: What about
the customers' questions
was difficult to answer?
- ☐ (1) Unique color
- ☐ (2) Unique smell
- ☐ (3) Has a bitter taste
- ☑ (4) Other bitter Send

*Fig. 18A*

We are conducting a survey
on the new product Sixpara.
Thank you for your help.

Question 1: What about
the customers' questions
was difficult to answer?
- ☐ (1) Unique color
- ☐ (2) Unique smell
- ☐ (3) Has a bitter taste
- ☑ (4) Other bitter taste Send

*Fig. 18B*

We are conducting a survey on the new product Sixpara. Thank you for your help.

Question 1: What about the customers' questions was difficult to answer?
☐ (1) Unique color
☐ (2) Unique smell
☐ (3) Has a bitter taste
☑ (4) Other as a pungent smell Send

*Fig. 19A*

You have selected item 4 for free reply, and have entered "has a pungent smell." Is this the same as fixed reply (2), "has a unique smell"?

Yes   No

*Fig. 19B*

Survey Planning Screen

1. Survey Period

Start Time: [2002] Year: [6] Month: [6] Day:
   End Time: [2002] Year: [6] Month: [6] Day:

2. Survey Order

☑ Set distribution order; do not distribute at same time

☑ Distribute first to respondents who responded with a free reply in past surveys in which there was no display of free replies of other respondents.

○ Condition Details
   Distribute first to respondents who, in the past [10] surveys, have made at least [5] free replies ☑ Priority distribution to store manager ☑ Priority distribution to specified respondents:

| Mikiko Tamai |
   | Hitomi Kaneo |
   | Mari Imaizumi |
   | None |
   | None |

[Set] [Cancel]

*Fig. 20*

| Survey ID | Survey Objective | Mode | Question ID | Question Contents | Option ID | Option Contents | Sub-option ID | Sub-option ID Sub-Option Content |
|---|---|---|---|---|---|---|---|---|
| 11 | Regarding new product Sixpara | Initial | 1 | What about customers' question was hard to answer? | 1 | Unique color | 1 | Gaudy |
|  |  |  |  |  |  |  | 2 | Gloomy |
|  |  |  |  |  | 2 | Unique smell | 1 | Not liked among people in their 20s |
|  |  |  |  |  |  |  | 2 | Not liked among people in their 40s |
|  |  |  |  |  | 3 | Is bitter | ... | ... |
|  |  |  |  |  | 4 | Other | ... | ... |
| ... | ... | ... | ... | ... | ... | ... | ... | ... |

*Fig.22*

POLLING SYSTEM AND METHOD PRESENTING A RECEIVED FREE REPLY AS A ANSWER OPTION TO A SUBSEQUENT RESPONDENT

BACKGROUND OF THE INVENTION

1. Technical Field

The present invention relates to polling methods, devices and computer products, to computer-readable storage medium on which such polling computer products have been recorded, and to poll reply methods.

2. Description of the Related Art

Poll gathering and analysis systems in which the collection of questionnaires is done on computers, reducing the burden involved in the compilation of poll results, are known. In such systems both free replies and elective replies, for example, can be entered. Free replies are replies that a poll respondent can freely write in reply to questions presented on a display or the like; elective replies are options stored ahead of time in a database or the like and presented together with questions to a poll respondent, who selects any of the options as a reply. Entered free replies and elective replies are stored in a database. Elective replies, because they can be converted to figures, are easier to compile. With free replies, on the other hand, because they allow poll respondents to write as they please, free opinions of individual respondents can be obtained (Japanese Pub. Pat. App. No. H08-272772).

As explained above, because free replies are freely written, the reply content is not easily compiled and analyzed. Therefore, a system has been proposed in which free replies are classified into categories and new questions are then drawn up, with those categories presented as reply options. Using such a system allows categories of free replies to be selected as reply options, resulting in accurate compilation (Japanese Pub. Pat. App. No. H08-272773).

In terms of the system disclosed in the above-noted Japanese Pub. Pat. App. No. H08-272773, the fact that categories of previously made free replies are available as reply options enables accurate compilation results to be obtained. However, the reply options thus created are categories; if the classification of free replies is not done properly, the reply options may not actually reflect the opinions behind the free replies. This makes it difficult for a person who responds by selecting a created reply option to select this reply option as his or her subjective and freely conceived opinion.

BRIEF SUMMARY OF THE INVENTION

An object of the present invention is to realize a polling method that encourages questionnaire respondents to make freely opinionated replies and allows diverse replies to be extensively collected.

The present invention in a first aspect is a polling method for conducting poll on a respondent group including at least one or more first respondent and second respondent, and comprises a first question step, a free reply step, a first storage step, a second question step, and a presentation step. The first question step presents a question to a first respondent. The free reply step accepts input by a first respondent of an unguided reply ("free reply" hereinafter) to the question. The first storage step stores as a reply option to the question a free reply input by the first respondent. The second question step, after input of the free reply by the first respondent, presents the question to the second respondent. The presentation step presents to the second respondent the reply option stored in the first storage step.

In this aspect of the present invention, questions are presented to the first respondent. Questions are presented, for example, by the sending of an email containing a URL that links to a Web page on which the questions appear, and enabling the first respondent to access that Web page by making that Web page accessible over the Internet. Alternatively, questions can be presented, for example, by sending questions in audio data format to the first respondent. A first respondent is allowed to enter a free reply. Here, free replies are responses to questions that a respondent enters in a manner he or she chooses, such as via text or voice. Free replies entered by the first respondent are stored as question reply options. It is preferable, in terms of operability, that the storage of responses as options be made by storing a program that defines a graphic user interface (GUI) such as list boxes and check boxes, a database, or other type of information on a storage medium such as a DRAM, FROM or hard disk. After entry of a free replies by the first respondent, questions are presented to second respondents. Then reply options stored in the storage step are presented to the second respondent.

In this way, a free reply entered by a first respondent is presented to a second respondent as a fixed reply option. Therefore, a survey taker, when commencing the survey, does not have to prepare question reply options but can simply present already received free replies as response guideposts for second respondents. Meanwhile, the second respondent views, as a reply option, previous free reply that matches their own opinion. As they view the opinions of others, it is easier for them to respond with their free and subjective opinion, using either a fixed response or free reply. For the survey taker, this means collection of a wide range of opinions.

In a second aspect, the polling method according to the first aspect of the invention further comprises: an elective reply step of input by the second respondent selection of the reply option presented in the presentation step ("elective reply" hereinafter); a second storage step of storing an elective reply accepted from a second respondent; and a compilation step of repeating the first question step, the free reply step, the first storage step, the second question step, the presentation step, the elective reply step, and the second storage step, and collecting and compiling elective replies and free replies from the respondent group.

In this aspect of the present invention, the selection by a second respondent of an option presented in the presentation step is accepted. The reply selected by second respondent is stored. The steps of the first question step, free reply step, storage step, second question step, presentation step and elective reply step are repeated and elective replies or free replies are collected from the respondent group and compiled.

Thus the free replies of respondents who have already responded are presented to a questionnaire respondent as reply options, allowing selection of such a presented option as a reply. Therefore, a respondent can choose a free reply that is close to his or her own opinion, and can make a reply with a high degree of freedom, without having to go to the trouble of entering his or her own free reply. A survey taker is able to compile as elective replies that otherwise would have been processed as free replies, leading to less time and effort spent in compilation. In other words, a survey taker can anticipate focused opinions while also obtaining a wide range of opinion and can anticipate easier compilation.

A polling method according to a third aspect of the invention is as set forth in the foregoing first or second aspects, but further comprising a first determination step of determining whether or not a free reply input by a first respondent and a predetermined reply option presented in the presentation step are substantially the same. Here, said presentation step further presents at least one predetermined reply option.

In this aspect of the present invention, it is determined whether a free reply entered by a first respondent is the same as a predetermined reply option. "Substantially the same" means that the contents are entirely or partially the same.

In this manner, determination can be made of similarity in content between a free reply entered by a first respondent and an existing reply option.

A fourth aspect of the present invention is the polling method according to the third aspect, and wherein the first storage step, if the first determination step determines that the free reply input by the first respondent and the predetermined reply option are not substantially the same, stores the free reply as a reply option to the question.

In this aspect of the present invention, when it is determined that a free reply entered by a first respondent is not substantially the same as a reply option, the free reply is stored as a reply option to the relevant question.

In this manner, because a free reply will not be stored as a reply option if it has substantially the same contents as an existing option, the storage of duplicate free replies is prevented.

In a fifth aspect, the polling method according to the second aspect of the invention; wherein: if the first determination step determines that the free reply input by the first respondent is substantially the same as the predetermined reply option, the compilation step compiles the free reply as an elective reply made by selection of the predetermined reply option.

In this aspect of the present invention, when it is determined that a free reply entered by a first respondent is substantially the same as an existing reply option, the free reply is counted as an elective reply that the respondent made by selecting the existing reply option.

In this manner, by counting a free reply as the selection of an option when a free reply has the same content as that option, a survey taker can reduce the time and effort spent in compilation.

A polling method according to the sixth aspect is as set forth in the foregoing third or fifth aspects of the invention, but further comprising a confirmation step of, if the first determination step determines that the free reply entered by the first respondent and the predetermined reply option are substantially the same, accepting from the first respondent confirmation as to whether or not the determination is correct; wherein the compiling is carried out if the determination is confirmed to be correct.

In this aspect of the present invention, when it is determined that a free reply entered by a first respondent is substantially the same as a reply option, confirmation is received from the first respondent as to whether that determination is correct. When it is confirmed that such determination is correct, the data is compiled.

In this manner, compilation is made after confirmation that the contents are the same, ensuring the reliability of the determination of sameness and compilation results.

The invention in a seventh aspect is the polling method according to any of the foregoing first, second, fourth, fifth or sixth aspects, but further comprising a conditions-setting step of accepting settings on conditions for designating at least one or more first respondents; wherein: in the first question step, the question is presented to at least one or more first respondents who have been extracted based on the conditions.

In this aspect of the present invention, settings are accepted for conditions for designation of at least one or more first respondents. Setting of conditions for designation of first respondents means the designation of such conditions as, for example, respondents in a certain position, respondents who have made a free reply at least once in the past, and respondents of a certain age group or sex, so that at least one or more respondents are extracted from a respondent group and designated as first respondents. The above first question step, free reply step and first storage step are executed for the at least one or more respondents extracted by the entered conditions. Thereafter, the second question step and presentation step are executed for at least one or more second respondents. The elective reply step and then the compilation step may also be executed for second respondents.

With such a configuration, the setting of conditions enables free replies to be obtained from the at least one or more respondents extracted based on those conditions. In other words, at least one or more respondents such as respondents who have made multiple free replies in the past or respondents with a specific position or are otherwise an opinion leader type are selected as first respondents, and free replies are collected from these first respondents first. Because free replies of first respondents are presented to second respondents as reply options, second respondents can view, for example, the rich and varied free replies of first respondents who have made many free replies in the past, or the helpful free options of persons in certain positions. Therefore, second respondents can view as reply options varied and helpful free replies, making it easier for them to respond with their own free opinion. In addition, if second respondents select such options, a survey taker can anticipate focused second respondent opinions as well as reduction of second respondent free replies, while also obtaining a wide range of opinion; a survey taker can also anticipate even easier compilation.

The invention in an eighth aspect is the polling method according to any of the foregoing second, fourth, fifth or sixth aspects, but further comprising: a second determination step of increasing a count of reply options to the question when a free reply is stored in the first storage step, and determining whether the count of reply options has reached a predetermined maximum value; a third storage step of storing correlatively with the question options that the presentation step has presented to the second respondents; and a re-surveying step of, if the second determination step determines that the reply options count has reached the maximum value, extracting based on data stored in the third storage step at least one or more second respondents who have made elective replies from options numbering a count that is a predetermined minimum value or less, and presenting the extracted second respondents with the question.

In this aspect of this present invention, in cases where after a respondent has responded, a free reply has been added as a reply option, questions with an added option are presented again to respondents who have already responded, giving all respondents equal reply conditions.

A polling method according to a ninth aspect of the invention is as set forth in the foregoing first or second aspects, but further comprising: an iterating step of repeating the first question step, the free reply step and the first storage step; and a control step in which the iterating step is terminated, and the presentation step and the second question step are performed.

In this aspect of the present invention, the first question step, free reply step and first storage step are repeated. This repeating is then ended by, for example, setting the number of repetitions, setting the repeat time, setting the number of free replies stored, or executing a repeat end command in real time.

With such a configuration, because how repeating will end can be designated, a survey taker can continue survey of first respondents until a wide range of worthwhile free replies are gathered. In addition, because presentation of free replies to second respondents comes after the repeating has ended, second respondents can view at once free replies that have already been given, making viewing of the replies easier and allowing a wider range of replies.

The invention in a tenth aspect is a polling device for conducting poll on a respondent group including at least one or more first respondents and second respondents, the polling device comprising: first question means for presenting a question to a first respondent; free reply means for accepting input by the first respondent of an unguided reply ("free reply" hereinafter) to said question; first storage means for storing a free reply input by the first respondent as a reply option to said question; second question means for presenting said question to a second respondent after input of the free reply by the first respondent; and presentation means for presenting to the second respondent the reply option stored by said first storage means.

The invention in a eleventh aspect is a polling computer product for conducting poll on a respondent group including at least one or more first respondents and second respondents, the computer product for causing a computer to function as: first question means for presenting a question to a first respondent; free reply means for accepting input by the first respondent of an unguided reply ("free reply" hereinafter) to said question; first storage means for storing a free reply input by the first respondent as a reply option to said question; second question means for presenting said question to a second respondent after input of the free reply by the first respondent; and presentation means for presenting to the second respondent the reply option stored by said first storage means.

The invention in a twelfth aspect is a computer-readable recording medium on which is recorded a polling program for conducting a poll on a respondent group including at least one or more first respondents and second respondents, the computer-readable recording medium on which is recorded a polling program for causing a computer to function as: first question means for presenting a question to a first respondent; free reply means for accepting input by the first respondent of an unguided reply ("free reply" hereinafter) to said question; first storage means for storing a free reply input by the first respondent as a reply option to said question; second question means for presenting said question to a second respondent after input of the free reply by the first respondent; and presentation means for presenting to the second respondent the reply option stored by said first storage means.

Conceivable recording media include computer-readable media such as a flexible disk, hard disk drive, semiconductor memory, CD-ROM, DVD, and MO disk.

The invention in one further aspect is a polling method comprising: a question step of displaying a question; a reply step of displaying at least one or more predetermined reply options to the displayed question, and accepting selection of any of the predetermined reply options, or input of an unguided reply ("free reply" hereinafter), to the question; a first determination step of determining whether a free reply is being entered; a second determination step of, if a free reply is being entered, determining whether the free reply being entered and any of the predetermined reply options will be substantially the same before the input of the free reply has finished; and a support step of, if the second determination step has determined that the free reply and a predetermined reply option will be substantially the same, supporting input of the free reply or selection of the predetermined reply option.

In this aspect of the invention, it is determined whether a free reply being entered and a predetermined reply option are substantially the same. If the determination is "same", entry of a free reply or selection of reply option is supported. Supporting a free reply can be, for example, copying and displaying the contents of a predetermined reply option as this free reply in the textbox in which free reply to a question is to be entered, or auto-completing a response. An example of reply option selection support is, when a free reply is the same as a predetermined reply option, to highlight that reply option and encourage the respondent to choose that option.

In such a manner, entry of free replies is simplified. In addition, entry of free replies that are the same as existing reply options can be prevented. Further, implementation of the above-mentioned survey method will prevent free replys that are the same as existing reply options from being stored as reply options.

Employing the present invention encourages respondents to give their free opinion in reply, and allows for questionnaires to gather a wide variety of replies.

From the following detailed description in conjunction with the accompanying drawings, the foregoing and other objects, features, aspects and advantages of the present invention will become readily apparent to those skilled in the art.

BRIEF DESCRIPTION OF SEVERAL VIEWS OF THE DRAWINGS

FIG. 2 is a conceptual explanatory diagram of data stored in a survey form database having to do with the first embodiment;

FIG. 3 is a conceptual explanatory diagram of data stored in a respondent database;

FIG. 4 is a conceptual explanatory diagram of data stored in a reply database;

FIG. 5 is a conceptual explanatory diagram of data stored in a compilation database;

FIG. 6 is an example of reply data;

FIG. 13A is an example of a survey form page;

FIG. 13B is an example of a comment entry page;

FIG. 14 is an example of a compilation results page;

FIG. 15A is an example of a free reply entry;

FIG. 15B is an example of a survey form page created by the main process;

FIG. 16A is an example of a free reply entry;

FIG. 16B is an example of a compilation results page;

FIG. 17A is an example of a free reply entry;

FIG. 17B is an example of an option highlighted by the reply-support process;

FIG. 18A is an example of a free reply entry;

FIG. 18B is an example of a free reply displayed by the reply-support process;

FIG. 19A is an example of a free reply entry;

FIG. 19B is an example of a confirmation screen presented by the main process;

FIG. 20 is an example of a survey planning screen;

FIG. 22 is a conceptual explanatory view of data stored in a survey form database having to do with a second embodiment;

DETAILED DESCRIPTION OF THE INVENTION

First Embodiment (1) Configuration

Figure 1:
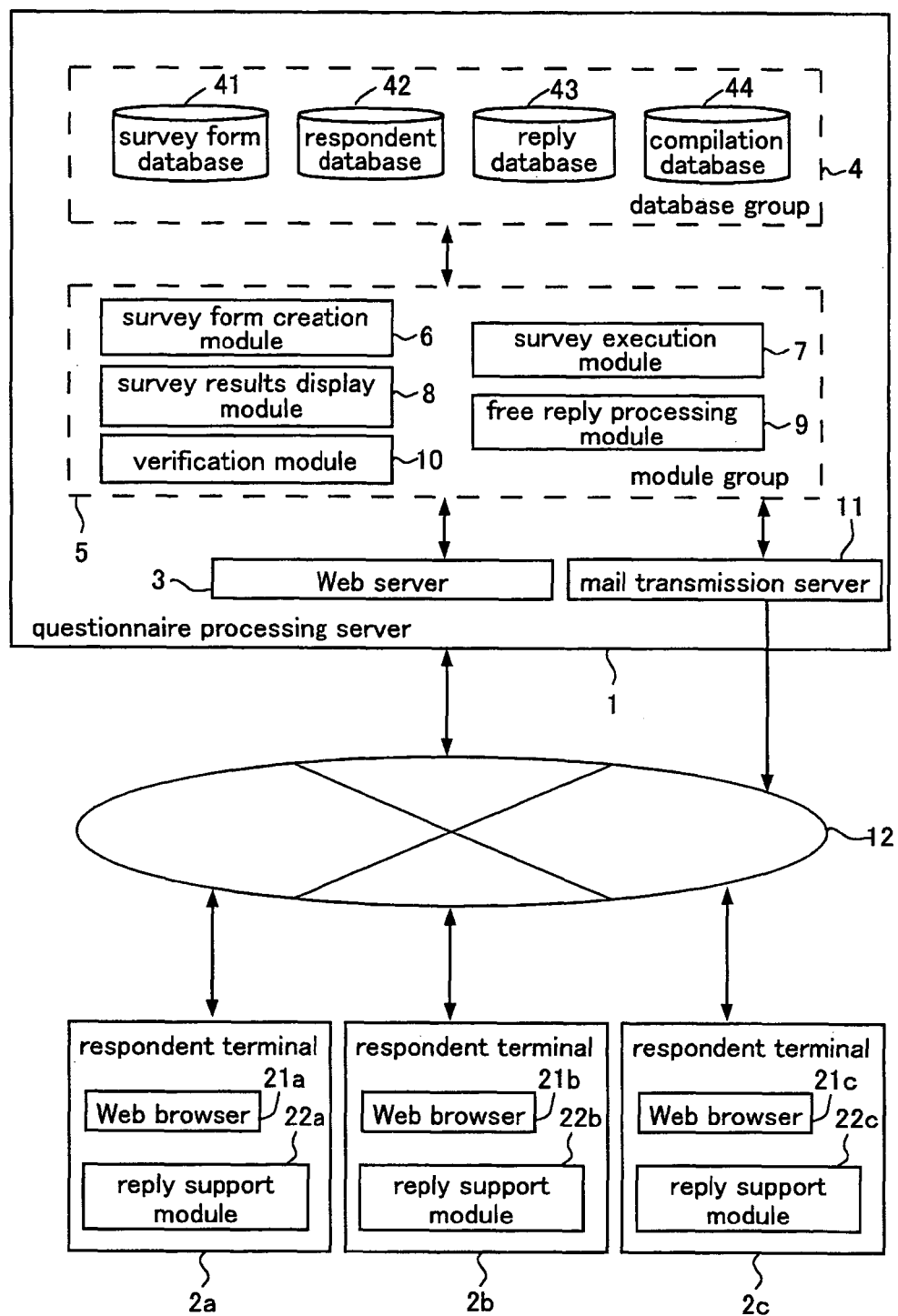
FIG. 1 is an overall configurational view of a questionnaire processing system having to do with a first embodiment.

FIG. 1 shows the overall configuration of a questionnaire processing system according to a first embodiment. In this system, a questionnaire processing server 1 and respondent terminals 2a, b, c . . . (hereinafter "respondent terminal 2") are interconnected over a network 12, which can be a LAN, the Internet or other network.

The respondent terminal 2 includes a Web browser 21 and reply support module 22. The Web browser 21 requests a Web server 3 to send a Web page, and then receives and displays that page. A reply support module 22 accepts reply entry, creates reply data (explained below) and sends this to the questionnaire processing server 1. The respondent terminal 2 is operated by a respondent responding to a poll. The respondent terminal 2 may be a personal computer, PDA, portable terminal or the like.

The questionnaire processing server 1 includes the Web server 3, a database group 4, a module group 5 and a mail transmission server 11; it collects and compiles replies to a poll. The Web server 3, in reply to a request from the Web browser 21, sends a survey form page (explained below) to the respondent terminal 2. The Web server 3 also receives reply data (explained below) sent from the respondent terminal 2, supplies this to the module group 5 and requests processing thereof. The mail transmission server 11 uses, for example, the publicly known Simple Mail Transfer Protocol (SMTP) to send e-mail. The Web server 3 and the mail transmission server 11 are connected to the network 12 and the module group 5. The Web server 3 and the mail transmission server 11 may be provided outside the questionnaire processing server 1, connecting with the module group 5 over the network 12. The module group 5 includes a survey form creation module 6, a survey execution module 7, a survey results display module 8, a free reply processing module 9 and a verification module 10. The database group 4 includes a survey form database 41, respondent database 42, reply database 43, and compilation database 44.

Figure 12:
FIG. 12 is an example of a survey form page.

The survey form creation module 6 creates a survey form page that is a Web page as shown in FIG. 12 in HTML file format or the like, based on data stored in the survey form database 41. A survey form page stored in advance on the Web server 3 ("default survey form page") is replaced by this newly created survey form page ("new survey form page"). As shown in FIG. 12, the contents of a question appear on a default survey form page. The default survey form page will accept entry of either an elective reply, for which replies are made by selecting either of the check boxes next to the reply options "(1) Unique color" or "(2) Unique smell", or a free reply, for which reply is made by selecting the check box next to "(3) Other" and entering text as one chooses into the text box. For example, by clicking a "Send" button, reply data including the entered elective reply or free reply is created, and sent from the respondent terminal 2 to the questionnaire processing server 1. Additionally, the survey form page may be configured to allow a comment to be appended to an elective reply. For example, as shown in FIG. 13A, a "Make a Comment" hyperlink may be embedded on a survey form page; when a respondent clicks this, a comment input screen as shown in FIG. 13B appears. A text box on this comment input screen accepts input of a comment to be appended to the selection of a reply option. Such a configuration not only allows the collection of a broad range of opinions while at the same time encouraging elective replies, it also facilitates compilation of data. Similarly, in the new survey form page shown in FIG. 16A, either a free reply or elective reply can be entered; when a respondent clicks the "Send" button, reply data is sent from the respondent terminal 2 to the questionnaire processing server 1. The creation of a new survey form page will be discussed below, in the discussion of the main process.

As shown in FIG. 6, reply data sent to the questionnaire processing server 1 includes respondent ID, survey ID, question ID and option ID, as well as free replies and other information. Respondent ID identifies a respondent in the respondent database 42; survey ID, question ID and option ID identify, in the survey form database 41, the survey to which a respondent has responded, question, selectable options and selected option(s) for that question. As shown in FIG. 6, reply data can be written in XML. The above-described comments as well as sub-free replies (discussed below), sub-option ID (discussed below) and the like may also be included in reply data.

Figure 21A:
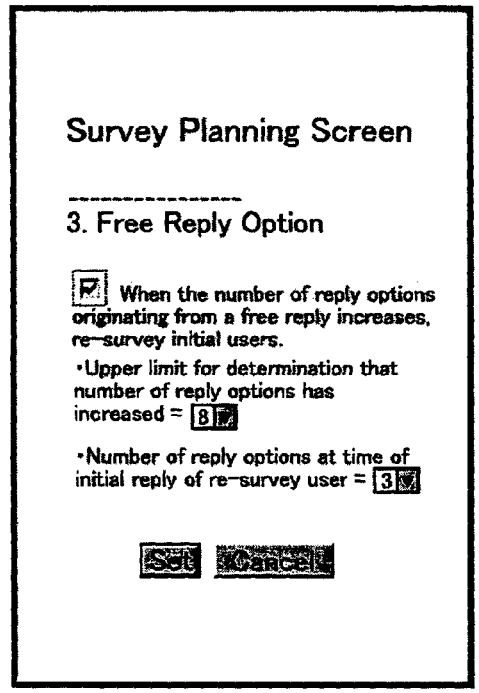
FIG. 21A is an example of a survey planning screen.
Figure 21B:
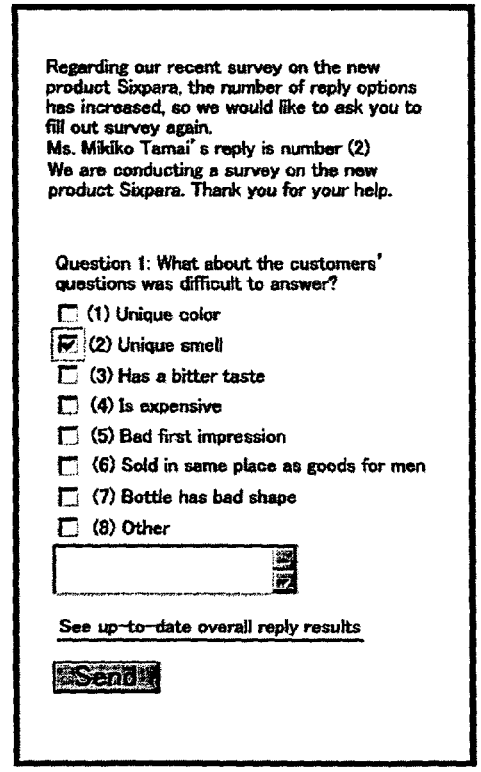
FIG. 21B is an example of a survey form page displayed at a URL transmitted in the re-surveying process.

The survey execution module 7 stores reply data received by the questionnaire processing server 1 in the reply database 43. The survey execution module 7 also compiles replies and stores them in the compilation database 44. The survey execution module 8, in accordance with a prioritized survey process (discussed below), switches an initial mode flag between ON and OFF, which is stored in a DRAM or the like (not in figures) in the questionnaire processing server 1. The initial mode flag, when on, is a flag for having a default survey form sent to all the respondent terminals 2, and when off, for having a new survey form sent. The default initial mode flag is off. Further, the survey execution module 7 accepts entry of prioritized survey conditions and the like on a survey planning screen, as shown in FIG. 20 and FIG. 21A and FIG. 21B, and stores the same in a not-illustrated DRAM or the like in the questionnaire processing server 1. Prioritized survey conditions are such matters as, on the survey planning screen shown in FIG. 20, checking "set an order for survey form distribution rather than simultaneous distribution" and setting an order in the "Priority Order" field in the respondent database 42; selecting the "Detailed Conditions" radio button and selecting from a list box past survey number and free reply number; checking "give priority to distribution of survey forms to store managers"; and checking "give priority to distribution of survey forms to specified respondents" and selecting the names of specified respondents from a list box. For reasons of confidentiality, it is preferable to limit access to these survey planning screens to specified individuals.

Figure 11:
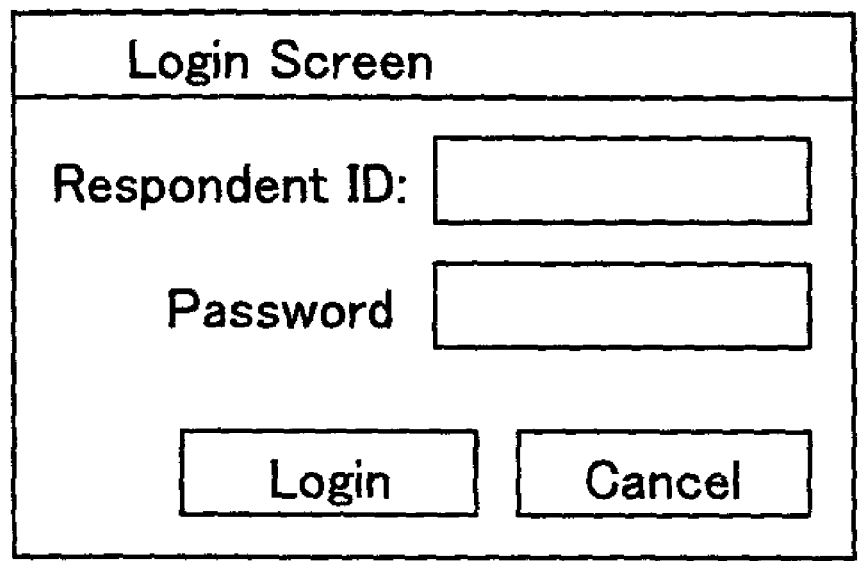
FIG. 11 is an example of a login screen.

The survey results display module 8 causes questionnaire compilation results as shown in FIGS. 14 and 16B to be displayed on a not-illustrated display for the questionnaire processing server 1, based on data stored in the compilation database 44. The free reply processing module 9 stores free replies included in reply data in the survey form database 41. As shown in FIG. 11, verification module 10 determines whether the combination of "respondent ID" and "password" entered at the login screen displayed on the Web browser 21 of a respondent terminal 2 matches any of a record in the respondent database 42 (hereinafter "when a respondent terminal 2 has logged in"). If the respondent ID and password are authenticated, verification module 10 allows the Web server 3 to send a survey form page to the Web browser 21 at which that respondent ID and password were entered.

FIG. 2 shows in table format data stored in the survey form database 41. The survey form database 41 has the following fields: "Survey ID," "Survey Objective," "Mode," "Question ID," "Question Contents," "Option ID," "Option Contents," and "Suboption." "Survey ID" is an identifier for a set (hereinafter "polling") of one or more survey form pages necessary for achieving the objective of a questionnaire-based survey. "Survey Objective" indicates the objective for a questionnaire-based survey. In the figure, "Regarding the New Product Sixpara" has been stored as the survey objective. "Mode" can be either "Initial" or "Standard"; this is referred to in mode survey processing (discussed below). "Question ID" is an identifier for questions included in a questionnaire. "Question Contents" is the contents of questions displayed on a survey form page. "Option ID" is an identifier for reply options. "Option Contents" is the contents of reply options displayed on a survey form page.

FIG. 3 shows data in table format stored in the respondent database 42. The respondent database 42 has the following fields: "Respondent ID," "Respondent," "Password," "Completed Survey ID," "Free Reply Count," and "Priority Order." "Respondent ID" is an identifier for a respondent who has sent reply data. "Respondent" is the name of the respondent identified by a respondent ID. "Password" is respondent authentication information, which is used in main processing (discussed below). "Completed Survey ID" is the survey ID for a questionnaire for which the questionnaire processing server 1 has already received reply data from a respondent; this is updated by the survey execution module 7. "Free Reply Count" is the current number of free replies included in reply data sent by a respondent. "Free Reply Count" shows the number of free replies created by a respondent, and is updated by the free reply processing module 9. "Priority Order" is the order in which the survey execution module 7 sends survey form pages to respondents.

FIG. 4 shows data stored in the reply database 43. In this database, reply options presented to respondents and selection results for each question are stored. Data stored in the reply database 43 is created based on reply data.

FIG. 5 shows in table format data stored in the compilation database 44. This table has the following fields: "Survey ID," "Question ID," "Option ID," and "Respondent Count." "Survey ID," "Question ID," and "Option ID" are the same as described above. "Respondent Count" is the total number of respondents who selected a certain option. A compilation results page as shown in FIG. 14 is created based on data stored in the compilation database 44.

(2) Process Flow (2-1) Process Performed by the Questionnaire Processing Server

The questionnaire processing server 1 executes a main process, a prioritized survey process, and a re-surveying process. These will be explained in detail.

(2-1-1) Main Process

Figure 7:
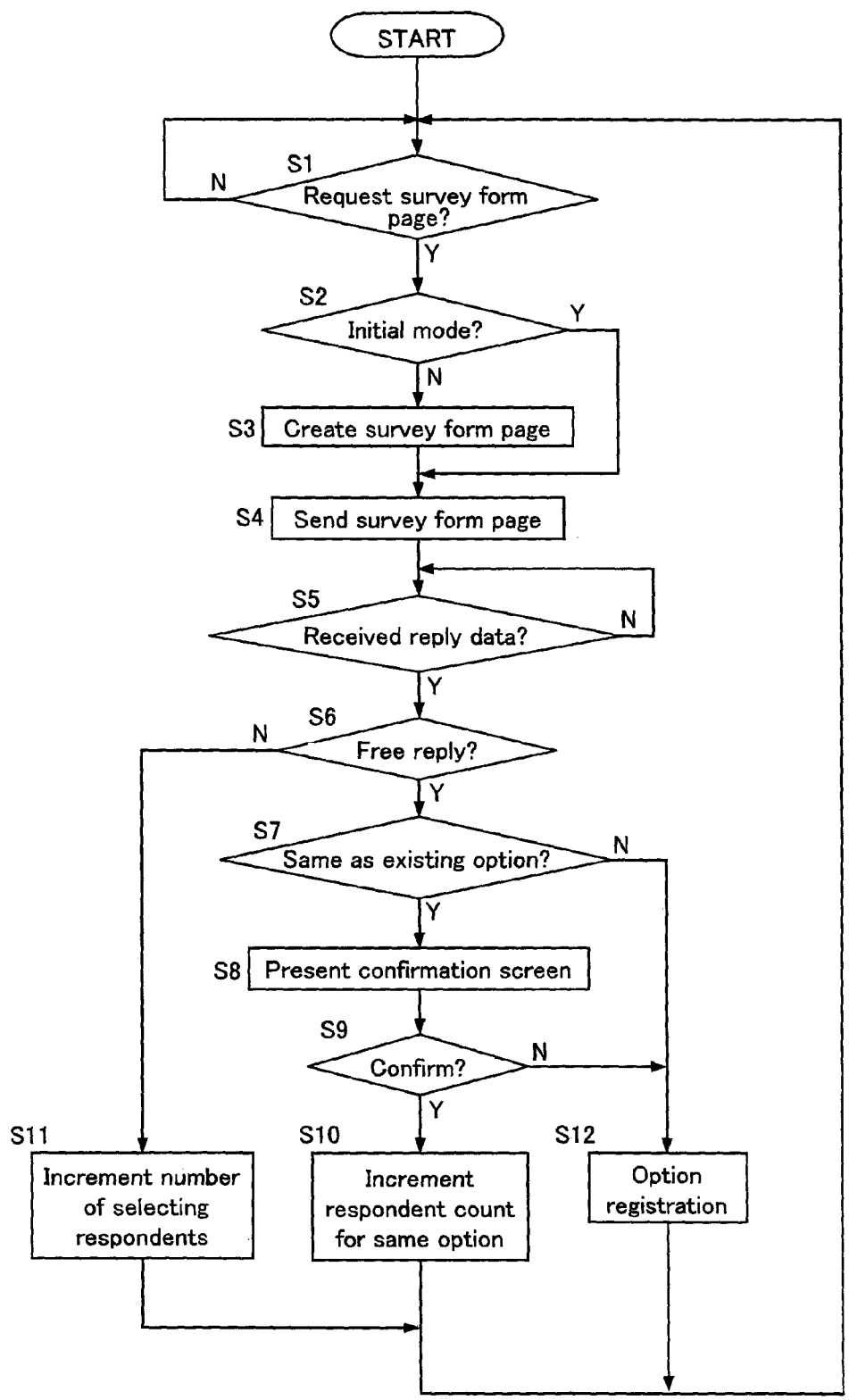
FIG. 7 is a main-process flowchart.

FIG. 7 is a flowchart representing a main process. Here, in cases where a free reply is not the same as an existing reply option, that free reply is registered in "Option Content" of the survey form database 41 together with a new option ID. This process commences when the current date and time reach the "Start Time" on the survey planning screen shown in FIG. 20.

Step S1: The verification module 10 determines whether a respondent terminal 2 has logged in and requested sending of a survey form page. If a request has been made, control proceeds to step S2. If a request has not been made, the above determination is repeated until a respondent terminal 2 has logged in and requested sending of a survey form page.

Step S2: The survey execution module 7 determines whether or not the initial mode flag (discussed below) is on. If the initial mode flag is on, control proceeds to step S4. If the initial mode flag is off, control proceeds to step S3.

Step S3: Based on data in the survey form database 41, the survey form creation module 6 creates a survey form page using an HTML file format or the like and stores this in the Web server 3.

Step S4: The Web server 3 sends to the respondent terminal 2 that requested sending of a survey form page a stored survey form page (i.e., the default survey form page) or a new survey form page.

Step S5: The survey execution module 7 determines whether reply data has been received from the respondent terminal 2. If it has been received, control proceeds to step S6. If it has not been received, step S5 is repeated and reception is awaited.

Step S6: The free reply processing module 9 determines whether reply data includes a free reply. If a free reply is included, control proceeds to step S7. If a free reply is not included, control proceeds to step S11.

Step S7: The free reply processing module 9 consults the survey form database 41 and determines whether any reply option for the relevant question and survey (hereinafter, "existing option") has content that matches the content of a free reply. If there is a match, control proceeds to step S8. If there is no match, control proceeds to Step S12. Here, the determination of whether the content of a free reply matches content of an existing option is made, for example, as follows. In cases where a portion of a keyword contained in an existing option is also contained in a free reply, a determination of matching is made. Alternatively, an existing option is associated with a sentence the content of which partially matches that existing option, and this is registered in another database. Then, when a free reply contains a registered sentence, it is determined that that free reply matches the existing option associated with that sentence.

Step S8: the survey execution module 7 provides to the Web browser 21, and causes display of, a confirmation screen, an example of which is shown in FIG. 19B. The confirmation screen shown in FIG. 19B asks whether the existing option "unique smell" is the same as the free reply "has a pungent smell" shown in 19A.

Step S9: The survey execution module 7 determines whether there has been an entry at the confirmation screen confirming that the entered free reply is the same as an existing option. For example, in the confirmation screen shown in FIG. 19B, if "Yes" is clicked, it is determined that such entry has been made. When an entry has been made indicating that the free reply and existing option have not been confirmed to be the same, for example, when the "No" button has been clicked in the screen shown in FIG. 19B, it is determined that an entry has not been made confirming that the free reply and existing option are the same. When such entry has been made, control proceeds to Step S10. When such entry has not been made, control proceeds to Step S112.

Step S10: The survey execution module 7 updates by incrementing by 1 the respondent count in the compilation database 44 for an existing option determined in step S7 to be the same as a free reply.

Step S11: The survey execution module 7 increments by 1 the respondent count in the compilation database 44 for the relevant elective reply.

Step S12: The free reply processing module 9 assigns an option ID to a free reply included in reply data and associates this free reply with the relevant survey ID and question ID and registers the same in the survey form database 41.

With the above process, when there is a free reply that is not substantially the same as an existing option, the free reply is stored in the survey form database 41 as an option. Then, a new survey form page is created based on this data in the survey form database 41 and sent to the respondent terminal. For example, as shown in FIG. 15A, a free reply entered on a default survey form page specified by survey ID and question ID is displayed as is on a new survey form page, as shown in FIG. 15B, as a reply option for that survey ID and question ID. In other words, because the free reply of one respondent, "it tastes bitter," is not substantially the same as either of the existing options, "unique color" or "unique smell," this free reply is stored in the survey form database 41. Then, the free reply "it tastes bitter" is added to the default survey form page, creating a new survey form page. Therefore, a respondent can view a previous free reply as a reply option. In addition, because respondents can select this previous free reply as their opinion, they do not have to go to the trouble of writing their own free reply, making it easier to select a reply that reflects their own opinion, and thereby facilitating the gathering of a variety of respondent opinion. In addition, a reply that otherwise would have to be processed as a free reply can be compiled in data as an elective reply, reducing the work involved in questionnaire compilation. Also, because a free reply entered by an earlier respondent becomes an elective reply option for coming respondents, a survey taker can commence a survey and provide guideposts for replies, without having to prepare reply options for a questionnaire. Meanwhile, as indicated above, the free reply "it tastes bitter," which is not substantially the same as the existing reply options "has a unique color" and "has a unique smell," is added as a reply option; thus the addition of duplicate reply options is prevented. On such occasion, when a free reply as that shown in FIG. 19A is entered, the respondent is asked at a confirmation screen as shown in FIG. 19B whether the determination that this free reply has substantially the same contents as an existing reply option is correct; thus the reliability of such determinations is ensured.

In addition, with the above process, when the content of a free reply is substantially the same as an existing option, that free reply is counted as the selection of that option. For example, supposing, as shown in FIG. 16A, that "it tastes bitter" has been entered as a free reply, then the free reply processing module 9 would determine that this free reply is substantially the same as the reply option "it has a bitter taste." Then, as shown in FIG. 16B, this free reply would be counted as selection of the reply option "it has a bitter taste." In this manner, a free reply is counted as selection of an existing reply option, reducing the time and effort that survey taker spends on compilation. On such an occasion, confirmation is made by asking the respondent whether the determination that this free reply has substantially the same contents as an existing reply option is correct; therefore, reliable compilation is secured.

(2-1-2) Prioritizing Process

Figure 8:
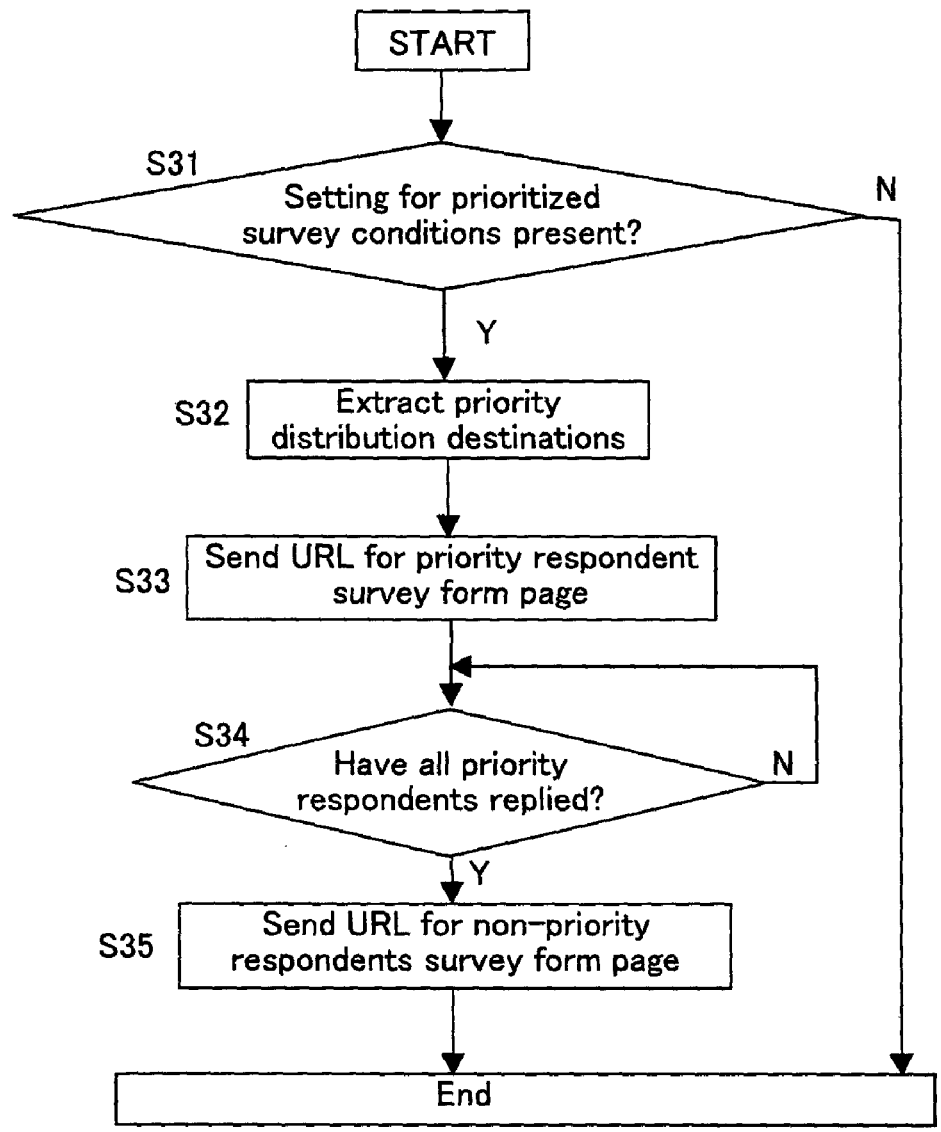
FIG. 8 is a prioritized-surveying process flowchart.

FIG. 8 is a flowchart representing a prioritizing process. This process gives priority to the collection of replies from specific respondent terminals 2, and commences when the current date and time reach the "Start Time" on the survey planning screen shown in FIG. 20. This process is executed independently of the main process.

Step S31: The survey execution module 7 determines whether or not settings for prioritized survey conditions are stored in a DRAM or the like (not shown in the figures) of questionnaire processing server 1. If such settings are stored, control proceeds to Step S32; if such settings are not stored, the process ends.

Step S32: The survey execution module 7 extracts from the respondent database 42 respondent IDs of records matching the prioritized survey conditions. The extraction can be performed, for example, by searching the fields "Respondent," "Completed Survey ID," "Free Reply Count" and "Priority Order," with prioritized survey conditions as keys.

Step S33: The survey execution module 7 switches the initial mode flag to on, and asks the mail transmission server 11 to send an e-mail containing a link to the URL of a survey form page to the respondent terminal 2 at which a respondent specified by an extracted respondent ID (hereinafter, "priority respondent") has logged in.

Step S34: The survey execution module 7 determines whether reply data has been received from all the respondent terminals 2 at which priority respondents have logged in. If all the reply data has been received, control proceeds to step S35. if all the reply data has not been received, step S34 is repeated and the reception of all the reply data is awaited.

Step S35: The survey execution module 7 refers to the "Completed Survey ID" field of the respondent database 42, and specifies the respondent terminals 2 at which respondents to whom the survey form page URL was not sent in step S33 (hereinafter "non-priority respondent") have logged in. The survey execution module 7 then requests the mail transmission server 11 to send an e-mail containing a link to the URL of the survey form page to the respondent terminal 2 at which non-priority respondents have logged on. The survey execution module 7 then switches the initial mode flag to off.

With the above process, prioritized survey conditions can be used to designate respondents who are opinion leader types, respondents with specific positions, or respondents who frequently contribute free replies; this allows free replies from these respondents to be gathered first, and these free replies can later be added as reply options at once. Therefore, non-priority respondents can choose from reply options that reflect the free opinions of priority respondents, making it easier for the survey taker to compile varied and free opinions.

In the main process described above, a default survey form page is sent to the respondent terminal 2 of priority respondents and a new survey form page is sent to the respondent terminal 2 of non-priority respondents. Therefore, because priority respondents do not see the free replies of other priority respondents, the entry of freely conceived opinions is encouraged. Meanwhile, non-priority respondents are sent a new survey form page to which has been added options that encapsulate the freely conceived opinions of priority respondents, such as respondents who are opinion leader types, respondents in specific positions, and respondents who frequently contribute free replies. Therefore, non-priority respondents can see and select from options that summarize the freely conceived opinions of priority respondents.

(2-1-3) Re-Surveying Process

Figure 9:
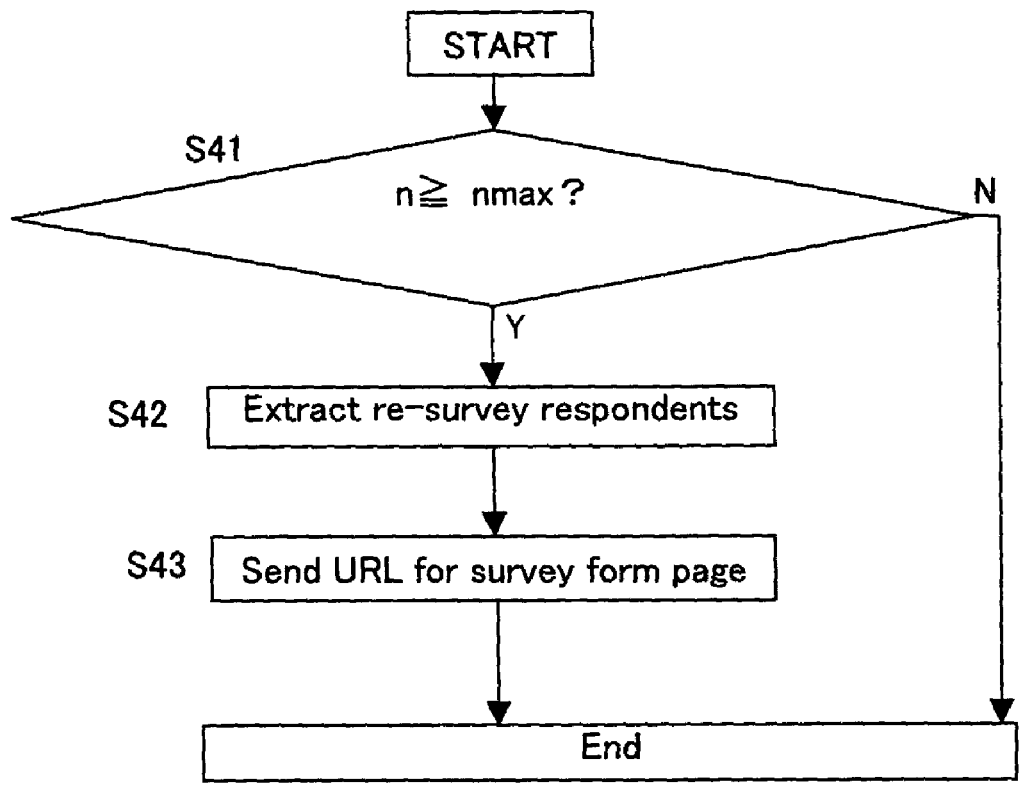
FIG. 9 is a re-surveying process flowchart.

FIG. 9 is a flow chart of a re-surveying process. In this process, the URL for a new survey form page to which free replies have been added as reply options is sent to respondents who have already responded, and who are then asked to respond again.

Step S41: The survey execution module 7 refers to the survey form database 41 and determines whether the total number n of reply options for question Q is greater than or equal to a predetermined maximum value $n_{max}$. If n is greater than or equal to $n_{max}$, control proceeds to Step S42; if n is less than $n_{max}$, then the process ends.

Step S42: The survey execution module 7 refers to the reply database 43 and extracts respondent IDs for respondents for whom the total number of reply options selectable at time of answering question Q was at or below a minimum value $n_{min}$ (hereinafter, "re-surveying respondent"). The $n_{max}$ and $n_{min}$ values are set at a survey planning screen as shown in FIG. 21A. In the example shown in the figure, $n_{max}$ is eight and $n_{min}$ is three.

Step S43: The survey execution module 7 requests the mail transmission server 11 to send an e-mail containing a link to the URL of a survey form page to the respondent terminals 2 at which respondents have logged in using a respondent ID of a re-surveying respondent. FIG. 21B shows a survey form page specified by this URL.

With the above process, as shown in FIG. 21B, when free replies have been added to the reply options after a round replies has been made, questions for which reply options is have been made can be presented again to respondents who responded previously, meaning that all respondents will be given equal reply conditions.

(2-2) Process Carried Out in Respondent Terminals

Figure 10:
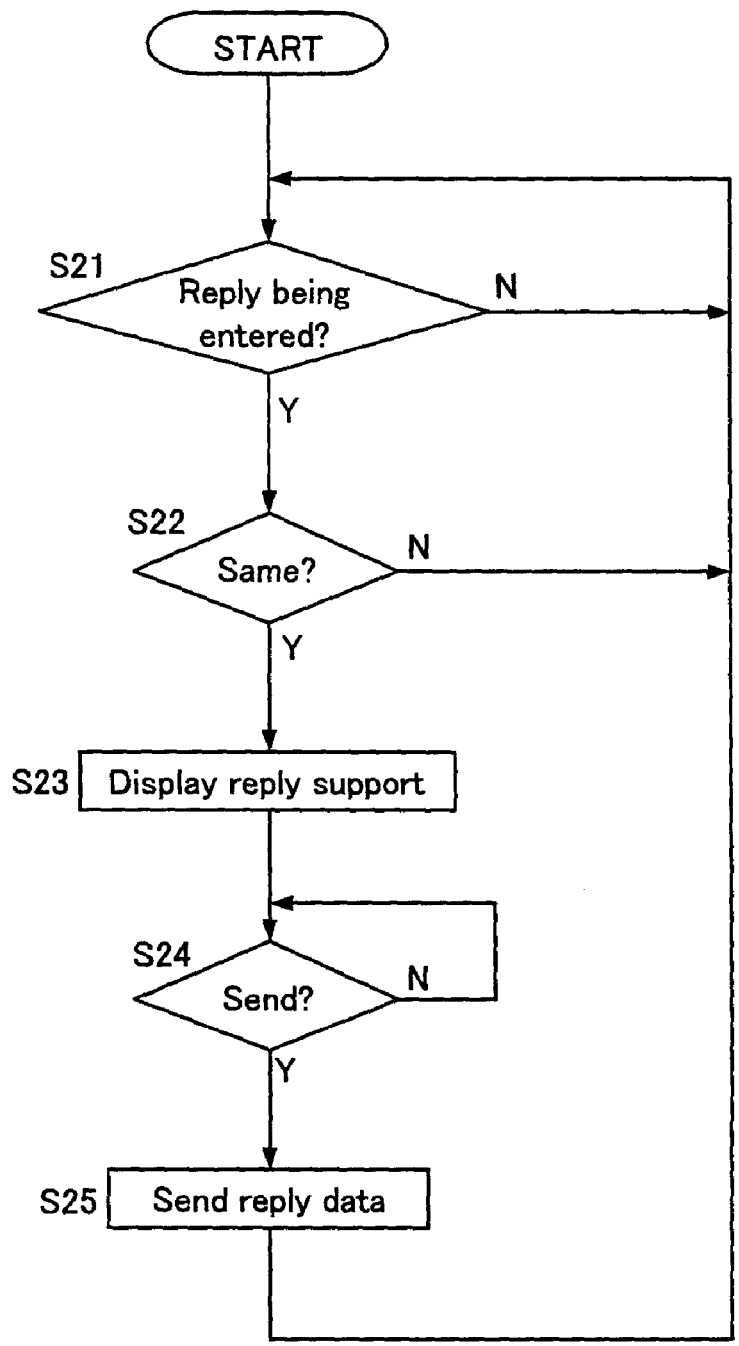
FIG. 10 is a reply-support process flowchart.

A reply-support process is carried out in the respondent terminal 2. FIG. 10 is a flowchart of the reply support process. In this process, when a free reply is entered in a respondent terminal 2, displays help a respondent reply appropriately, and an entered elective reply or free reply is sent to the questionnaire processing server 1 as reply data.

Step S21: The reply support module 22 determines whether a free reply is being entered. If a free reply is being entered, control proceeds to Step S22. If a free reply is not being entered, the above determination is repeated and a free reply is awaited.

Step S22: The reply support module 22 determines whether the free reply being entered has the same content as any of the reply options on the survey form page. If the determination is "same," control proceeds to Step S23. If determination is not same, control returns to step S21. Here, the determination of same or not same is made in the following manner. If, for example, a portion of a keyword contained in a reply option is contained in the free reply being entered, a determination of same is made. Alternatively, reply options and words and phrases with partially the same contents as those reply options are associated and registered in a not-illustrated separate database on a respondent terminal 2. When a free reply being entered contains a registered word or phrase, it is determined that the free reply is the same as the reply option associated with the registered word or phrase.

Step S23: The reply support module 22 causes the Web browser 21 to display reply support. Reply support display may be carried out in the following manner. Supposing that, as shown in FIG. 17A, "bitter taste" is being entered as a free reply, then the reply support module 22, when it has determined that this free reply is the same as the reply option "it has a bitter taste," highlights the reply option "it has a bitter taste," as shown in FIG. 17B. Alternatively supposing that, as shown in FIG. 18A, "bitter" is being entered as a free reply, then as shown in FIG. 18B, the reply support module 22, when it has determined that this free reply is the same as the reply option "it has a bitter taste," displays in the text box for free reply entry the phrase "it has a bitter taste," which is identical to the reply option.

Step S24: The reply support module 22 determines whether the "Send" button on the survey form page shown in FIGS. 17 and 18 has been clicked. If it has been clicked, control proceeds to Step S25. If it has not been clicked, the above determination is repeated and a click is awaited.

Step S25: The reply support module 22 sends reply data that contains an elective reply entered on the survey form page or a free reply is sent to the questionnaire processing server 1.

With the above process, when a free reply has substantially the same content as an existing reply option, the existing reply option is displayed as a free reply, or that reply option is highlighted, or reply support display is otherwise carried out. Therefore, time-wasting free reply entries that merely repeat what an existing reply option says can be prevented, simplifying the entry of free replies. In addition, in the main process described above, it is possible to prevent registration in the survey form database 41, as a reply option, of a free reply that has the same content as an existing option.

Second Embodiment

In the first embodiment, an elective reply is made by selection of an option, and a comment or other free opinion cannot entered as an attachment thereto; however, an embodiment may be configured so that the appending of a comment to a selected option is allowed, and that such comment is stored as a reply option. For example, as in the first embodiment, a questionnaire processing system comprises a questionnaire processing server 1 and respondent terminal 2. Here, as shown in FIG. 22, the survey form database 41 of the questionnaire processing server 1 is the survey form database 41 of the first embodiment, additionally including as fields "Sub-Option ID" and "Sub-Option." As shown in FIG. 23C and FIG. 23D, "Sub-Option ID" is an identifier for sub-option, which is an option displayed in association with an option. "Sub-Option" is the contents of a sub-option displayed on a survey form page. As shown in FIG. 22, one or a plurality of sub-option IDs can be associated with a single option ID.

Figure 23A:
FIG. 23A is an example of a survey form page.
Figure 23B:
FIG. 23B is an example of a sub-page.
Figure 23C:
FIG. 23C is an example of a survey form page on which a sub-option is displayed.
Figure 23D:
FIG. 23D is an example of a survey form page on which sub-options are displayed.

Meanwhile, a "Sub-Free Reply" button is provided on a survey form page, as in the example shown in FIG. 23A, FIG. 23C, and FIG. 23D. The sub-page shown in FIG. 23B is linked to this button. When this button is clicked, the Web server 3 sends a sub-page to the Web browser 21. A sub-page is provided for each option; for example, the sub-page of FIG. 23B belongs to the option "a unique smell."

After text has been entered on a sub-page (hereinafter, "Sub-Free Reply") and the "Send" button clicked, the reply support module 22 stores the sub-free reply in a DRAM or the like (not in figures). Then, when the "Send" button on the survey form page shown in FIG. 23A is clicked, the reply support module 22 creates reply data that includes the stored free reply and sends this to the questionnaire processing server 1, as in the first embodiment.

As with a free reply in the first embodiment, when the questionnaire processing server 1 receives reply data, it also assigns a sub-option ID to a sub-free reply included in reply data, associates this sub-free reply with a survey ID and question ID, and registers it in the survey form database 41. Then, as in the first embodiment, the questionnaire processing server 1 creates a survey page based on data in the survey form database 41 and transmits it. As shown in FIG. 23C, on this new survey form page, a sub-option is displayed associated with the option to which it corresponds. This sub-option can be selected in addition to the selection of the corresponding option. Then, when a sub-option is selected, the reply support module 22 creates and then sends reply data that further contains the sub-option ID of a selected sub-option, as in the first embodiment. Based on this reply data, the questionnaire processing server 1 compiles selection of sub-option (hereinafter, "sub-elective reply") in the same manner as compilation in the first embodiment.

For example, as shown in FIG. 23B, when the sub-free reply "Smell is not liked by people in their 20s" is entered with regard to the option "unique smell" and the "Send" button clicked, as shown in FIG. 23C, a new survey form page on which the entered free reply is displayed in association with the option "a unique smell." As shown in FIG. 23C, "Smell is not liked by people in their 20s" is displayed as a sub-option appended to the option "a unique smell." This sub-option can be selected as an addition to the selection of the option "a unique smell."

As shown in FIG. 23C and FIG. 23D, the system may be configured so that a "Sub-Free Reply" button is provided for a sub-option, and when this button is clicked a sub-page is displayed in the same manner as shown in FIG. 23B, enabling entry of a sub-free reply. The system may also be configured so that a sub-option ID field and sub-option field which correspond to the survey form database 41 are further provided in the survey form database 41, and an entered sub-free reply can be registered as a sub-option. In addition, when a plurality of sub-options have been appended to a single option, as shown in FIG. 23D, the plurality of sub-options appended to the reply option may be displayed.

Such a configuration enables entry of a sub-free reply, which elaborates in greater detail on an existing option. Therefore, unlike in simple free reply, dispersion of reply content over a too broad range can be avoided, and amount of free reply text can be reduced. Meanwhile, a sub-free reply is added to a new survey form as a sub-option and selection of a sub-option can be entered in addition to selection of an option, allowing compilation of sub-elective replies describing more detailed opinions regarding an existing option.

Other Embodiments

A. The first embodiment may be configured so that a free reply stored as an option is differentiated from options that a survey taker has prepared in advance, or a free reply is assigned an identifier in order to identify the priority respondent who made the reply from which the free reply originated or a free reply is associated with an identifier of a respondent and stored. Then, indication is made that an option prepared in advance by a survey taker, or that it originated from the reply of a certain priority respondent. With such a configuration, it will be even easier for a non-priority respondent in the first embodiment to view the free replies of respondents who are opinion leader types or respondents in certain positions.

B. The system may be configured so that when a new survey form page has been created in step S3 in the main process of the first embodiment, notification to such effect is given to the respondent terminals 2 that have not yet sent reply data. For example, the survey execution module 7 refers to "Completed Survey ID" in the respondent database 42 and identifies respondent terminals 2 that have not yet sent reply data. Then, because the number of reply options on the survey form page has increased, it requests the mail transmission server 11 to send to the specified respondent terminals 2 an e-mail to the effect that the update (reload) button of the Web browser 21 must be clicked. Alternatively, the system may be configured so that when the reply support module 22 has received a notification to this effect, it requests the Web browser 21 to update (reload) the survey form page. With such a configuration, respondents who have received transmission of the survey form page but have not yet responded can be reliably made to use the new survey form page that was newly created after such reception.

C. The present invention includes recording media on which are recorded programs that execute the foregoing methods under the present invention. Recording media herein may be, to name examples, flexible disks, hard disks, semiconductor memory, CD-ROMs, DVDs, magneto-optical disks (MOs), and other computer-read/writeable recording media.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A polling method performed by a processor for conducting a poll on a respondent group including at least one or more first respondents and second respondents, the polling method comprising:
    a first questioning performed by a first terminal during the poll by presenting an input form with a question to a first respondent;
    obtaining performed by the first terminal a free reply by accepting input onto the input form by a first respondent of an unguided reply to said question;
    a first storing for storing in a processing server the free reply input by the first respondent as a reply option to said question;
    closing performed by the first terminal the input form presented to the first respondent;
    a second questioning performed by a second terminal during the poll by presenting an input form with said question and the stored free reply as a reply option to the question to a second respondent after storing the input free reply; and
    accepting performed by the second terminal a choice of the stored free reply as a reply to said question on the input form presented to the second respondent.

2. A polling method according to claim 1, further comprising:
    obtaining performed by the second terminal an elective reply by accepting from a second respondent selection of a reply presented in said presenting to the second, respondent
    a second storing in the processing server an elective input by the second respondent; and
    compiling by repeating said first questioning, said obtaining the free reply, said first storing, said second questioning, said presenting, said obtaining an elective reply, and said second storing, and collecting and compiling elective replies and free replies from said respondent group.

3. A polling method according to claim 1, further comprising a first determining performed by the processing server to determine whether a free reply input by a first respondent and a predetermined reply option presented are substantially the same, said presenting further presenting at least one predetermined reply option.

4. A polling method according to claim 3, wherein said first storing stores in the processing server said free reply as a reply option to said question, upon said first determining having determined that said free reply input by said first respondent and said predetermined reply option are not substantially the same.

5. A polling method according to claim 3, wherein:
    upon said first determining having determined that said free reply input by said first respondent is substantially the same as said predetermined reply, said compiling compiles said free reply as an elective reply made by selection of said predetermined reply.

6. A polling method according to claim 3, further comprising confirming performed by the processing server upon said first determining having determined that said free reply input by said first respondent and said predetermined reply option are substantially the same, accepting from said first respondent confirmation as to whether or not the determination is correct; wherein
said compiling is carried out when said determination is confirmed to be correct.

7. A polling method according to any of claim 1, 2, 4, 5 or 6, further comprising conditions-setting performed by the processing server by accepting settings on conditions for designating at least one or more first respondents; wherein:
in said first questioning, said question is presented to one or more first respondents who have been extracted based on said conditions.

8. A polling method according to any of claim 2, 4, 5, or 6, further comprising:
a second determining performed by the processing server of increasing a count of reply options to said question when a free reply is stored in said first storing, and determining whether the count of reply has reached a predetermined maximum value;
a third storing in the processing server of storing correlatively with said question options that said presenting has presented to second respondents; and
a re-surveying performed by the processing server of, upon said second determining having determined that said reply options count has reached said maximum value, extracting based on data stored in said third storing second respondents who have made elective replies from options numbering a count that is a predetermined minimum value or less, and presenting said extracted second respondents with said question.

9. A polling method according to either claim 1 or claim 2, further comprising:
iterating by repeating said first questioning, said obtaining a free reply and said first storing; and
controlling which said iterating terminated, and said presenting and said second questioning are performed.

10. A polling method according to claim 2, further comprising a first determining performed by the processing server of determining whether a free reply input by a first respondent and a predetermined reply option presented in said presenting are substantially the same, wherein said presenting further representing at least one predetermined reply option.

11. A polling method according to claim 5, further comprising confirming performed by the processing server of when said first determining determines that said free reply input by said first respondent and said predetermined reply option are substantially the same, accepting from said first respondent confirmation as to whether the determination is correct; wherein
said compiling is carried out when said determination is confirmed to be correct.

12. A polling device for conducting a poll on a respondent group including at least one or more first respondents and second respondents, the polling device comprising:
a first question unit configured to present an input form with a question to a first respondent during the poll;
a free reply unit configured to obtain a free reply by accepting input onto the input form by a first respondent of an unguided reply to said question;
a sending unit configured to send a processing server the free reply input by the first respondent as a reply option to said question;
a closing unit configured to close the input form presented to the first respondent;
a receiving unit configured to receive, from the processing server, an input form with the question and the free reply as a reply option to said question;
a second question unit configured to present during the poll the received input form with said question and the free reply as a reply option to the question to a second respondent; and
an accepting unit configured to accept a choice of the free reply as a reply to said question on the input form presented to the second respondent.

13. A polling computer product for conducting a poll on a respondent group including at least one or more first respondents and second respondents, the computer product for causing a computer to function as:
a first question unit configured to present an input form with a question to a first respondent during the poll;
a free reply unit configured to obtain a free reply by accepting input onto the input form by a first respondent of an unguided reply to said question;
a sending unit configured to send a processing server the free reply input by the first respondent as a reply option to said question;
a closing unit configured to close the input form presented to the first respondent;
a receiving unit configured to receive, from the processing server, an input form with the question and the free reply as a reply option to said question;
a second question unit configured to present during the poll the received input form with said question and the free reply as a reply option to the question to a second respondent; and
an accepting unit configured to accept a choice of the free reply as a reply to said question on the input form presented to the second respondent.

14. A computer-readable recording medium on which is recorded a polling program for conducting a poll on a respondent group including at least one or more first respondents and second respondents, the computer-readable recording medium on which is recorded a polling program for causing a computer to function as:
a first question unit configured to present an input form with a question to a first respondent during the poll;
a free reply unit configured to obtain a free reply by accepting input onto the input form by a first respondent of an unguided reply to said question;
a sending unit configured to send a processing server the free reply input by the first respondent as a reply option to said question;
a closing unit configured to close the input form presented to the first respondent;
a receiving unit configured to receive, from the processing server, an input form with the question and the free reply as a reply option to said question;
a second question unit configured to present during the poll the received input form with said question and the free reply as a reply option to the question to a second respondent; and
an accepting unit configured to accept a choice of the free reply as a reply to said question on the input form presented to the second respondent.

* * * * *

UNITED STATES PATENT AND TRADEMARK OFFICE
CERTIFICATE OF CORRECTION

| | | |
|---|---|---|
| PATENT NO. | : 7,818,199 B2 | Page 1 of 1 |
| APPLICATION NO. | : 10/646890 | |
| DATED | : October 19, 2010 | |
| INVENTOR(S) | : Watanabe et al. | |

It is certified that error appears in the above-identified patent and that said Letters Patent is hereby corrected as shown below:

First Page Column 1 (Title), Line 3 delete "A" before Answer and insert -- AN --, therefor.

Column 1, Line 3 delete "A" and insert -- AN --, after Answer.

Column 17, Line 42 in Claim 9, delete "controlling which said iterating terminated" and insert -- controlling in which said iterating is terminated --, therefor.

Signed and Sealed this
Twelfth Day of July, 2011

David J. Kappos
*Director of the United States Patent and Trademark Office*